2,873,251
NON-CLAY-REACTIVE DRILLING FLUID

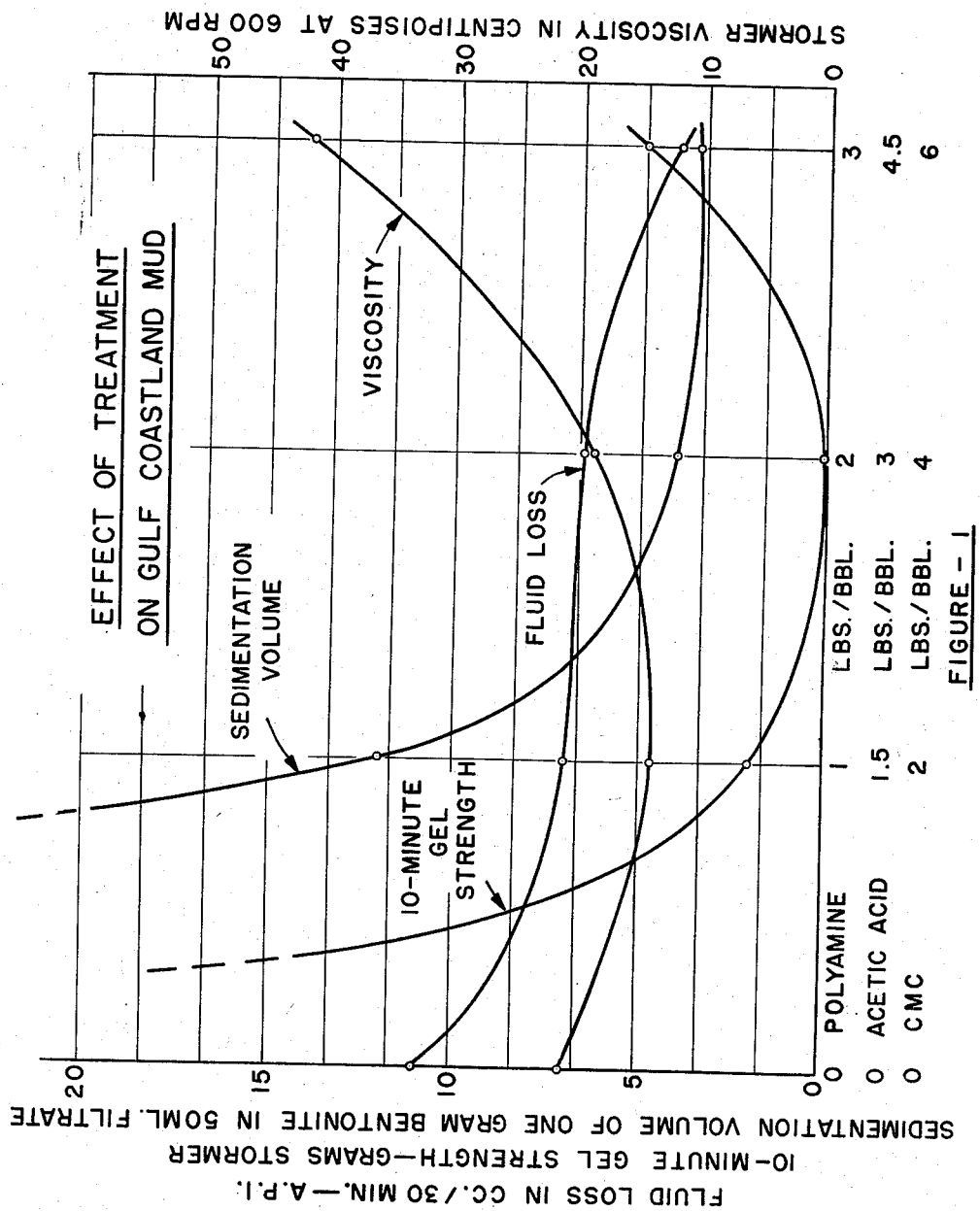

Frank O. Jones, Jr., Tulsa, Okla., assignor to Pan American Petroleum Corporation, a corporation of Delaware Application September 19, 1956, Serial No. 611,092

18 Claims. (Cl. 252—8.5)

This invention relates to water-base drilling fluids used for drilling wells, such as wells for producing oil and gas, and is directed particularly to the treatment of such drilling fluids to impart improved properties thereto, as well as to inhibit the filtrate of such fluids from reducing the permeability of clay-containing formations by reacting adversely with the clay fraction therein. This application is a continuation-in-part of my application Serial Number 396,001, filed December 3, 1953, now abandoned.

The functions and properties of the fluids used in the drilling of oil and gas wells are generally well known and understood. For the great majority of well-drilling situations a water-base mud containing suspended matter of the clay type is adequate and to be preferred on the basis of low cost. Certain special muds, however, may be required in particular situations, and even in ordinary drilling operations some harm to possible producing formations may result from the use of ordinary aqueous muds due to the fact that the filtrate therefrom may react adversely on the clays sometimes present in the formations. Whether the reaction is one of causing swelling of the clay particles, dispersing them to form a suspension, or a combination of these and other effects is not known, but the net result is a reduction of the formation permeability which interferes with the producing abilities of certain oil-producing strata.

In view of the foregoing it is a primary object of my invention to provide an improved aqueous drilling fluid especially adapted for drilling heaving shales or other formations apt to be damaged by a fresh-water mud filtrate. A further object is to provide a treatment adaptable to substantially any water-clay drilling fluid to convert it to a non-clay-reactive fluid. A still further object is to provide a treatment for aqueous, clay-type drilling fluids which is adaptable to improve other drilling-fluid properties, in addition to rendering the drilling fluid filtrate substantially non-clay-reactive and minimizing interference with electric logging. Other and further objects, uses, and advantages of my invention will become apparent as the description proceeds.

Stated briefly, I have discovered that an aqueous drilling fluid of the ordinary water-clay type can be converted into a drilling fluid of improved physical properties, having at the same time both a filtrate which effectively prevents adverse reactions with clays and also an improved resistance to contamination. This is accomplished by first treating the drilling fluid with a polyamine salt, and then adding a carboxylated polymer of the type exemplified by alkali metal carboxymethylcelluloses and polyacrylates.

This will be better understood by reference to the examples to follow, taken with the drawing which shows graphically the results of various proportions and treatments on a typical drilling fluid.

EXAMPLES

A fresh-water mud from the High Island Field of Texas was chosen for tests. This mud contained bentonite, high-yield clay, and barytes in addition to some natural mud solids accumulated from drilling. The mud had previously been treated to some extent with sodium acid pyrophosphate for viscosity control.

A polyamine salt was made in situ in the mud by adding triethylene tetramine (abbreviated as TETA) followed by a chemically equivalent amount of acetic acid (abbreviated as HAc). Introduction of the polyamine and acid into the mud immediately resulted in flocculation, accompanied by large increases in viscosity and gel strength, which, however, could be somewhat reduced by vigorous stirring. Although the fluid loss was also high, the presence of the polyamine salt therein rendered the filtrate substantially non-reactive with clays. Thereafter, addition of sodium carboxymethylcellulose (abbreviated as CMC) markedly reduced the viscosity and gel strength of the mud, decreased its fluid loss, and in all respects restored it to as good or better properties for drilling than before the treatment with the polyamine, while the filtrate continued to be non-clay-reactive.

The effects of various amounts and proportions of polyamine salt and sodium carboxymethylcellulose upon the properties of the mud, including its clay-reactive property are shown in Table I. The usual mud properties were determined by standard methods, and the effect of clay reactions with the filtrate was determined by measuring the sedimentation volume occupied by one gram of dry bentonite when mixed with 50 ml. of mud filtrate and allowed to settle. In this column "Inf." means that the bentonite dispersed completely and remained so, without settling.

Table I
EFFECT OF ADDITIVES ON MUD PROPERTIES

| Additives, lb./bbl. | | | Stormer Viscosity (600 R.P.M.) Cpse. | Stormer Gel Str., Grams | | API Fluid Loss, cc. (30 min.) | Mud Wt., lb./gal. | pH | Sedimentation Vol. of 1 gr. Bentonite |
| --- | --- | --- | --- | --- | --- | --- | --- | --- | --- |
| TETA | HAc | CMC | | Init. | 10-min. | | | | |
| 0 | 0 | 0 | 21 | 16 | 217 | 11 | 9.7 | 8.9 | Inf. |
| 1 | 1.5 | 2 | 14 | 0 | 2 | 7 | 9.7 | 7.9 | 12 |
| 2 | 3 | 4 | 19 | 0 | 0 | 6.5 | 9.7 | 7.6 | 4 |
| 3 | 4.5 | 6 | 42 | 0 | 5 | 4 | 9.7 | 7.4 | 3.5 |
| 2 | 3 | 0 | 33 | 16 | 22 | >200 | 9.7 | 7.6 | |
| 2 | 3 | 2 | 15 | 0 | 23 | 52 | 9.7 | 7.6 | |
| 2 | 3 | 6 | 61 | 1 | 12 | 3.5 | 9.7 | 7.6 | |
| Sat. NaCl Solution | | | | | | | | | 3.5 |

This table and the drawing show that the optimum treatment is about 2 pounds per barrel of triethylene tetramine, 3 pounds per barrel acetic acid, and 4 pounds per barrel sodium carboxymethylcellulose. With this proportion of materials, the mud properties are satisfactory, viscosity and gel strength are low, and the filtrate rate is near a minimum, along with the clay-reactive effect. Compared with saturated brine, the filtrate is about equally non-reactive with clays.

From this table and the graph it is apparent that the mud containing both triethylene tetrammonium acetate and sodium carboxymethylcellulose possesses lower viscosity and gel strength than the mud treated with triethylene tetrammonium acetate alone. This is different from the usual result obtained by adding sodium carboxymethylcellulose to an ordinary, salt-flocculated mud, the usual result being that a thickening occurs. It is believed this viscosity and gel strength reduction is evidence that the carboxymethylcellulose enters into a relation with the polyamine salt which is different from its relationship with ordinary electrolytes.

The effect of a number of common contaminating materials encountered in drilling was tested on the mud formulated according to the optimum formulation above, that is, 2 pounds per barrel polyamine, 3 pounds per barrel acetic acid, and 4 pounds per barrel sodium carboxymethylcellulose. Calcium sulfate, sodium chloride, cement, and bentonite clay were added to the treated mud, and the effects were studied. The results are shown in Table II and demonstrate that calcium sulfate and sodium chloride, which ordinarily affect an aqueous drilling fluid tremendously, had virtually no effect upon the improved mud. Cement had some adverse effect on the mud, but it was not too serious. Some thickening occurred with dry bentonite, but up to 30 pounds per barrel could be tolerated.

*Table II*

EFFECT OF CONTAMINANTS UPON MUD CONT'G 2# TETA, 3# HAc, 4# CMC PER BBL.

| Contaminant, lb./bbl. | Stormer Viscosity (600 R. P. M.) Cpse. | Stormer Gel Str. Grams | | API Fluid Loss, cc. (30 min.) | pH |
|---|---|---|---|---|---|
| | | Init. | 10-min. | | |
| No. contam | 18 | 0 | 0 | 5.5 | 7.6 |
| 10 CaSO₄ | 22 | 0 | 0 | 5.5 | 7.5 |
| 10 NaCl | 19 | 0 | 0 | 5.5 | 7.5 |
| 10 Cement | 18 | 0 | 0 | 9 | 11.8 |
| 30 Bentonite | 34 | 0 | 1 | 5 | 8.0 |

Samples of the mud treated with the optimum formulation were aged in a rolling oven for 96 hours to test the stability of the treatment. Temperature of the oven was controlled at 130° F. Tests were made at 24, 48, and 96 hours, mud properties being determined before and after a 15-minute period of stirring at high speed. The results shown in Table III demonstrate that the mud properties deteriorated somewhat with aging but were readily restored substantially to the original properties by the vigorous stirring.

*Table III*

EFFECT OF AGING WITH AGITATION AT 130° F. UPON MUD OF TABLE II

| Time | Stormer Viscosity (600 R. P. M.) Cpse. | Stormer Gel Str., Grams | | API Fluid Loss, cc. (30 min.) |
|---|---|---|---|---|
| | | Init. | 10-min. | |
| 24 hr. no stirring | 61 | 0 | 1 | 20 |
| 24 hr., stirred high speed 15 min. | 18 | 0 | 0 | 16 |
| 48 hr. no stirring | 89 | 0 | 8 | 23.5 |
| 48 hr., stirred high speed 15 min. | 21 | 0 | 1 | 14 |
| 96 hr. no stirring | 78 | 0 | 7 | 38 |
| 96 hr., stirred high speed 15 min. | 19 | 0 | 0 | 15 |

Filtrate loss tests showed that temperature had no noticeable effect upon the optimum mud formulation up to 190° F. At 300° F. and 4000 pounds per square inch pressure, however, the filtrate rate of the mud increased considerably, although the viscosity and gel strength were very little affected. The filtrate, however, retained its non-clay-reactive properties.

In spite of the fact that the measured gel strength was nearly zero, weighting materials are still satisfactorily suspended by this mud. A quantity of the mud was weighted with barytes to 14.2 pounds per gallon and placed in a container. After standing quiescent for 24 hours, the top layer of fluid was decanted, and its weight per gallon was measured. This was found still to be 14.2, indicating that if there was any settling out of weighting material at all, it was completely negligible.

That the results obtained and discussed above are not unique to the particular field mud initially tested is shown by tests on a number of additional muds from wells in areas of the Gulf Coast, Oklahoma, and Rocky Mountains. As is shown by the following table, these muds treated with the optimum formulation gave in practically every case improved properties and the desired non-clay-reactive filtrate. In only one case was the filtrate rate adversely affected. In all of the others it was improved.

*Table IV*

COMPATIBILITY OF FORMULATION 2 LB. TETA, 3 LB. HAc, 4 LB. CMC PER BBL. WITH VARIOUS FIELD MUDS

| | Visc. | Zero Min. Gel | 10-Min. Gel | Fluid Loss | pH | Weight |
|---|---|---|---|---|---|---|
| G. W. Goree "B" No. 1, W. Yoward, Texas | | | | | | |
| Untreated | 19 | 2 | 198 | 10 | 7.8 | 9.7 |
| Treated | 21.5 | 0 | 5 | 13.5 | 7.4 | 9.7 |
| Jos. S. Drake "A" No. 2, Sholem Alechem, Oklahoma | | | | | | |
| Untreated | 9 | 1 | 34 | 20 | 8.0 | 9.5 |
| Treated | 16 | 0 | 4 | 9.5 | 7.5 | 9.5 |
| A. M. Eason No. 11, E. Velma, Oklahoma | | | | | | |
| Untreated | 19 | 1 | 72 | 12 | 8.1 | 10.2 |
| Treated | 29 | 0 | 14 | 8 | 7.6 | 10.2 |
| Middle Mountain Unit No. 1, Wildcat, Wyoming | | | | | | |
| Untreated | 23 | 16 | 22 | 61 | 8.0 | 10.7 |
| Treated | 17 | 0 | 4 | 15 | 7.5 | 10.7 |

As a check on the non-clay-reactive properties indicated by the bentonite sedimentation tests shown in Table I above, tests were performed on nine cores, as alike as possible and known to undergo permeability reduction upon contact with fresh water. As proof of similarity each core was first saturated with oil, and its specific permeability to oil was measured. Thereafter, a solution of 1 N. sodium chloride was flowed through each core at a pressure differential of 30 inches of mercury until a new equilibrium permeability was attained. Following this, oil was again flowed through each core at the 30-inch (Hg) pressure differential until a final equilibrium permeability to oil was reached, which was adopted as a "standard" against which to compare the results of further treatment. This type of preparation, giving a relative oil permeability in the presence of some water in the core, was considered to approximate conditions found in oil reservoirs where both oil and water are present.

The nine cores were then divided into three groups of three each, the first group being flushed with the filtrate from the non-clay-reactive mud of the present invention, the second group with the filtrate from an ordinary aqueous mud, and the third group with distilled water. Next, oil was again flowed through each core at 30 inches of mercury differential pressure until equilibrium relative permeability was again reached, and the resultant figure was compared against the "standard" for that core.

Comparison showed that in the three cores of the first group an average of 98 percent of the "standard" oil permeability remained after contact with the filtrate from the non-clay-reactive mud. By contrast, the three cores of the second group, contacted with ordinary mud filtrate, regained only an average of 77 percent of their "standard" permeability; and for the third group, contacted with distilled water, the remaining permeability averaged only 72 percent of the "standard." Thus, it is considered that the improvement shown to reside in the present invention, showing less than 1/10 of the permeability loss incurred with either fresh-water mud filtrate or distilled water, is outstanding.

Other water-soluble amines than triethylene tetramine which have been tried and found substantially equally effective are ethylene diamine, diethylene triamine, and tetraethylene pentamine. Monoamines, with only one amino group per molecule, have also been tried and produced a non-clay-reactive filtrate, but other mud properties were generally unsatisfactory. Since polyamines containing other hydrocarbon groups than ethylene (for example, propylene or butylene), have generally similar properties to the ethylene series of polyamines, they can be used along with or instead of the ethylene-containing polyamines.

Also, since other alkali metal or ammonium salts of carboxymethylcellulose closely resemble sodium carboxymethylcellulose in substantially all respects, they may be used along with or instead of the sodium salt if preferred for any reason. Alkali metal or ammonium polyacrylates may also be used along with or instead of the carboxymethylcelluloses, but sodium polyacrylate, for example, is somewhat less effective than sodium carboxymethycellulose, so that the resultant mud properties are slightly inferior. Conventional water-loss reducers such as starch, Irish moss, and agar-agar do not effect a viscosity reduction as do the polymeric carboxylates. It therefore appears that the carboxyl groups present in the carboxymethylcellulose and the polyacrylate are necessary to achieve the viscosity reduction.

Other acids than acetic acid can be employed to form the polyamine salt, but a weak acid such as acetic is to be preferred since the salts of such weak acids in solution have a higher pH than comparable salts of the strong acids, such as chlorides and sulfates, for example. Since the waters found in subterranean formations are generally slightly alkaline, the acetate is more compatible therewith than a chloride or a sulfate. Nevertheless, if preferred for any reason, one of the latter salts could be formed instead of the acetate.

In forming the polyamine salt in a high pH mud containing caustic, or in adding a preformed polyamine salt to such a mud, it is advisable to add acid or use sufficient additional acid to neutralize the caustic, as otherwise some decomposition of the amine salt may occur.

In the foregoing examples the amine salt was made in situ by separately but simultaneously adding the polyamine and acid to the mud. Where a previously prepared salt is used, the amount to be employed is the sum of the two components which would be added separately, since amine salts form directly by addition without the creation of water. Thus, 5 pounds of triethylene tetrammonium acetate per barrel are exactly equivalent to 2 pounds of triethylene tetramine and 3 pounds acetic acid per barrel, shown in Figure 1 to be close to an optimum treatment, along with about 4 pounds of sodium carboxymethylcellulose per barrel.

In compounding or treating a drilling mud in the field, it is generally more convenient to handle or store the materials in a dry, solid form in paper bags rather than as liquids. The carboxymethylcellulose or polyacrylate offers no problem in this regard, as both are commercially available as dry, free-flowing powders. The polyamine and acid, however, may be a somewhat different matter. By proper choice of the acid, the amine and the reaction conditions, the polyamine salt can be obtained in a dry, pure form. Or it can be prepared in the presence of water and the water driven off. Adding this salt directly to the mud gives the same results as adding the acid and amine in liquid form separately but simultaneously to the mud, or as a solution after reaction in a quantity of water.

Sometimes, however, it is more convenient to prepare the amine salt as a dry, free-flowing powder by reacting the commercial liquid amine and acid in the presence of or on the surface of an inert, powdered carrier. For example, a dry, free-flowing material has been prepared by combining, by weight

| | Parts |
|---|---|
| Powdered Vinsol resin | 10 |
| Polyamine H special | 2 |
| Acetic acid | 3 |

Vinsol resin is a hard, brittle, thermoplastic resin derived from pine wood. It has been used because it is slightly oil-soluble and is therefore less likely than some other materials to block the pores of an oil-producing stratum. The polyamine H is a mixture of amines ranging generally from diethylene triamine to tetraethylene pentamine. The preparation consists simply in adding the liquid amine and acid slowly to the resin powder with stirring, over a period of time. As some heat is evolved, the reaction vessel should be cooled, or sufficient time should be allowed for the heat to dissipate. When the reaction is complete, the amine salt is dispersed substantially uniformly over and between the resin particles.

In use, a sufficient quantity of the powder is added to the drilling fluid to provide the desired amount of amine salt, which dissolves off the carrier medium and goes into solution in the drilling fluid water. As the resin functions primarily as an inert carrier, any of a number of similar materials may be used instead, provided they are compatible with the drilling fluid. Thus, clay, diatomaceous earth, pulverized shells, and ground limestone are typical substances useful as the inert carrier. As some of these materials differ in their absorbency, it may be necessary to vary the proportion of solids to the acid and amine somewhat so that the resultant product is free-flowing; but it will be obvious to those skilled in the art how to do this.

As an example of the use of this dry-mix concentrate, a nearly solids-free fluid useful in working-over wells was prepared by adding to each barrel (42 gallons) of water 7.5 lbs. of the amine salt-resin powder, 2 lbs. of sodium carboxymethylcellulose, 4 gallons of diesel oil, and 2 lbs. of Irish moss. This fluid had a viscosity of 48 centipoises and a fluid-loss rate of 5.5 cc. in 30 minutes.

In this composition, which had the desired non-clay-reactive filtrate, the function of the Irish moss was to act as a protective colloid which lowered the fluid loss and reduced the amount of carboxymethylcellulose required. The diesel oil formed a stable emulsion with the other components of the composition, adding some viscosity and other properties desired of a work-over fluid for oil wells. In place of the Irish moss any of a number of similar protective colloids can be used such as certain natural gums. Omitting the protective colloid and increasing the carboxymethylcellulose to compensate generally produces a fluid of lower viscosity.

Electric logs made in holes drilled with the mud of the present invention are satisfactory due to the fact that the mud contains only a slightly larger concentration of conductive ionic material than is found in untreated muds.

In view of the foregoing examples, it will be apparent to those skilled in the art that a number of modifications and treatments are possible. The invention therefore should not be considered as limited to the details set forth in these examples, but its scope is properly to be ascertained by reference to the appended claims.

I claim:

1. A drilling fluid comprising water, suspended solids, a minor amount of a water-soluble salt of a water-soluble polyamine sufficient to render the drilling-fluid filtrate substantially non-clay-reactive, and a minor amount of at least one carboxylated polymer selected from the group consisting of alkali metal and ammonium carboxymethylcelluloses and polyacrylates, sufficient to render the fluid-loss, viscosity, and gel strength of said fluid satisfactory for drilling.

2. A drilling fluid comprising water, suspended solids, a minor amount of a water-soluble polyamide and a stoichiometric amount of a water-soluble acid to form the water-soluble salt of said polyamine, said polyamine and acid being effective to render the drilling-fluid filtrate substantially non-clay-reactive, and a minor amount of at least one carboxylated polymer selected from the group consisting of alkali metal and ammonium carboxymethylcelluloses and polyacrylates, sufficient to render the fluid-loss, viscosity, and gel strength of said fluid satisfactory for drilling.

3. A drilling fluid comprising water, suspended solids, from 2.5 to 7.5 pounds of a water-soluble salt of a water-soluble polyamine per 42-gallon barrel, and from 2 to 6 pounds of a carboxylated polymer selected from the group consisting of alkali metal and ammonium carboxymethylcelluloses and polyacrylates per 42-gallon barrel of said fluid.

4. A drilling fluid comprising water, suspended solids, from 1 to 3 pounds of a water-soluble polyamine per barrel, a stoichiometric amount of a water-soluble weak acid to form the water-soluble salt of said polyamine, and from 2 to 6 pounds of an alkali metal carboxymethylcellulose.

5. A drilling fluid comprising water, suspended solids, about 5 pounds of a water-soluble salt of a water-soluble polyamine per barrel, and about 4 pounds of an alkali metal carboxymethylcellulose per barrel of said fluid.

6. A drilling fluid comprising water, suspended solids, about 2 pounds of a water-soluble polyamine, about 3 pounds of a water-soluble weak acid capable of forming a water-soluble salt of said polyamine, and about 4 pounds of an alkali metal carboxymethylcellulose per barrel of said fluid.

7. A drilling fluid comprising water, suspended solids, from 2.5 to 7.5 pounds of a water-soluble salt of a water-soluble, ethylene-containing polyamine per barrel, and from 2 to 6 pounds of an alkali metal carboxymethylcellulose per barrel of said fluid.

8. A drilling fluid as in claim 7 in which said water-soluble salt is triethylene tetrammonium acetate.

9. A drilling fluid as in claim 7 in which said alkali metal is sodium.

10. A drilling fluid comprising water, suspended solids, from 1 to 3 pounds of a water-soluble, ethylene-containing polyamine per barrel, a stoichiometric amount of water-soluble weak acid to form the water-soluble salt of said amine, and 2 to 6 pounds of an alkali metal carboxymethylcellulose per barrel of said fluid.

11. A drilling fluid as in claim 10 in which said polyamine is triethylene tetramine, and said acid is acetic acid.

12. A drilling fluid as in claim 10 in which said alkali metal is sodium.

13. In a process of drilling a well through formations containing clays which are reactive with fresh water wherein there is circulated in the well a water-base drilling fluid comprising water and suspended solids which form a filter cake on the well walls, the method of drilling said clay-containing formations while inhibiting reaction of the clays with filtrate passing through said filter cake which comprises admixing with said drilling fluid, with agitation, from 2.5 to 7.5 pounds of a water-soluble salt of a water-soluble polyamine per barrel of said fluid, and at least one carboxylated polymer selected from the group consisting of alkali metal and ammonium carboxymethylcelluloses and polyacrylates, in an amount sufficient to disperse said solids and to substantially reduce the viscosity, gel strength, and fluid loss of said drilling fluid, and circulating the resulting drilling fluid in said well while said clay-containing formations are being penetrated.

14. The method of claim 13 in which said water-soluble salt is formed in situ by adding 1 to 3 pounds of a water-soluble, ethylene-containing polyamine, and a stoichiometric amount of a water-soluble weak acid.

15. The method of claim 13 in which said carboxylated polymer is an alkali metal carboxymethylcellulose.

16. The method of claim 13 in which said polyamine salt is triethylene terammonium acetate and said carboxylated polymer is sodium carboxymethylcellulose.

17. A drilling fluid comprising water, a minor amount of diesel oil emulsified in said water, a minor amount of a protective colloid dispersed in said water, a small amount of a water-soluble salt of a water-soluble polyamine sufficient to render the drilling-fluid filtrate substantially non-clay-reactive, and a minor amount of at least one carboxylated polymer selected from the group consisting of alkali metal and ammonium carboxymethylcelluloses and polyacrylates, sufficient to render the fluid-loss, viscosity, and gel strength of said fluid satisfactory for drilling.

18. A dry, powdered, free-flowing drilling-fluid additive adapted for rendering the filtrate of an aqueous drilling fluid non-clay-reactive comprising by weight about 2 parts of a water-soluble polyamine, about 3 parts of a water-soluble acid, and about 10 parts of a powdered, hard, brittle, slightly oil-soluble resin derived from pine wood and characterized by freedom from wood rosin, solubility in alcohol, substantial insolubility in gasoline, a methoxy content of about 3 percent to about 6 percent, an acid number of about 100, a naphtha insolubility of about 98 percent, and a melting point of about 125° C.

References Cited in the file of this patent

UNITED STATES PATENTS

| | | |
|---|---|---|
| 2,193,026 | Hall | Mar. 12, 1940 |
| 2,320,009 | Ralston | May 25, 1943 |
| 2,348,639 | O'Brien | May 9, 1944 |
| 2,536,113 | Wagner | Jan. 2, 1951 |
| 2,552,775 | Fischer | May 15, 1951 |
| 2,599,342 | Meadors | June 3, 1952 |

UNITED STATES PATENT OFFICE
CERTIFICATE OF CORRECTION

February 10, 1959

Patent No. 2,873,251

Frank O. Jones, Jr.

It is hereby certified that error appears in the printed specification of the above numbered patent requiring correction and that the said Letters Patent should read as corrected below.

Column 6, line 15, after "pine wood." insert -- It is characterized by freedom from wood rosin, solubility in alcohol, substantial insolubility in gasoline, a methoxy content of about 3 percent to about 6 percent, an acid number of about 100, a naptha insolubility of about 98 percent, and a melting point of about 125° C. --; column 7, line 7, for "polyamide" read -- polyamine --.

Signed and sealed this 2nd day of June 1959.

(SEAL)

Attest:
KARL H. AXLINE
Attesting Officer

ROBERT C. WATSON
Commissioner of Patents